July 30, 1963 C. E. SCHOU 3,099,166
DRIVE MECHANISM

Original Filed June 8, 1956 6 Sheets-Sheet 1

INVENTOR
CARL E. SCHOU

BY Strauch, Nolan & Neale
ATTORNEYS

July 30, 1963
C. E. SCHOU
3,099,166
DRIVE MECHANISM
Original Filed June 8, 1956
6 Sheets-Sheet 2
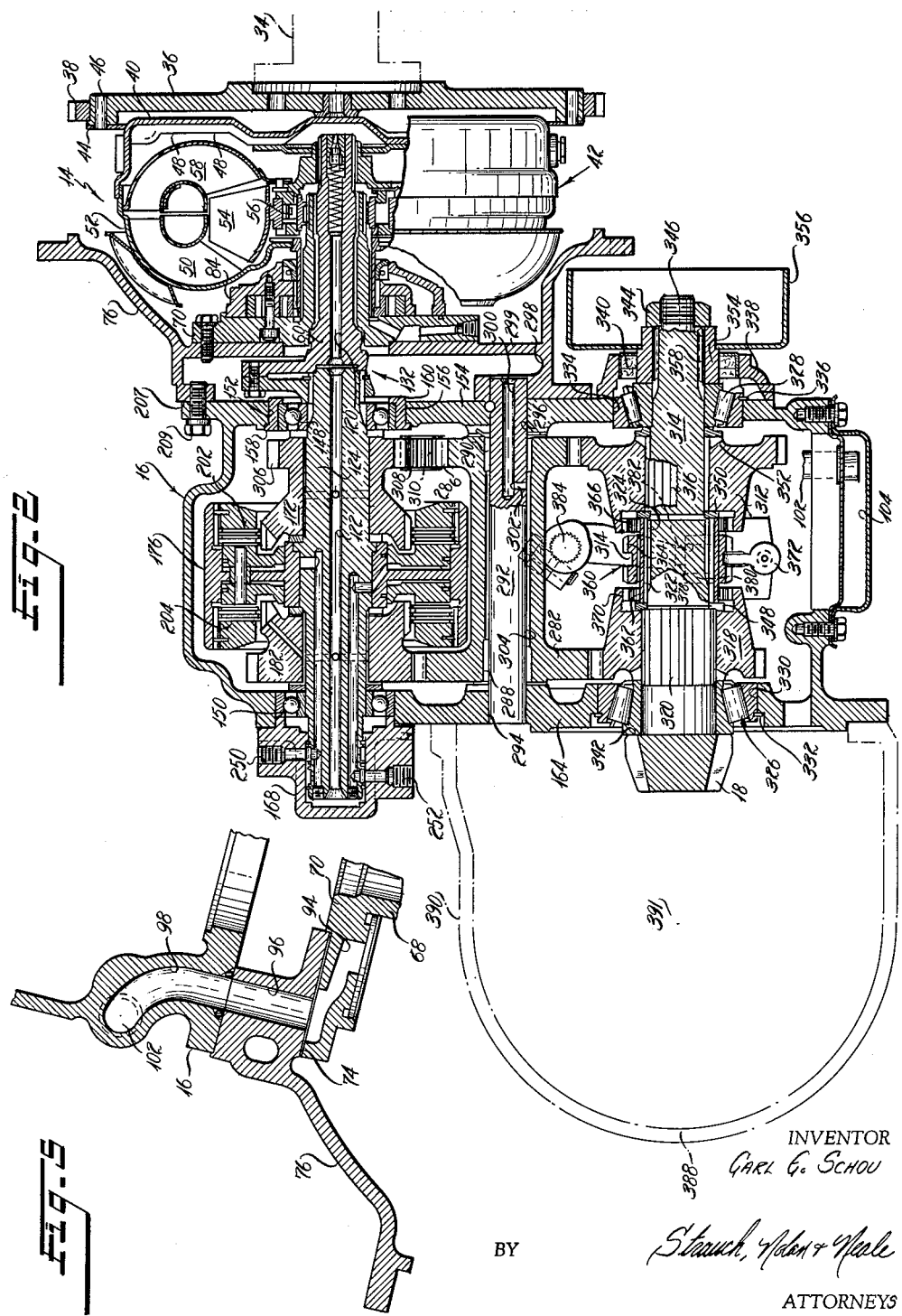
INVENTOR
CARL E. SCHOU
BY Strauch, Nolan & Neale
ATTORNEYS

INVENTOR
CARL G. SCHOU

BY Strauch, Nolan & Neale

ATTORNEYS

INVENTOR
CARL E. SCHOU

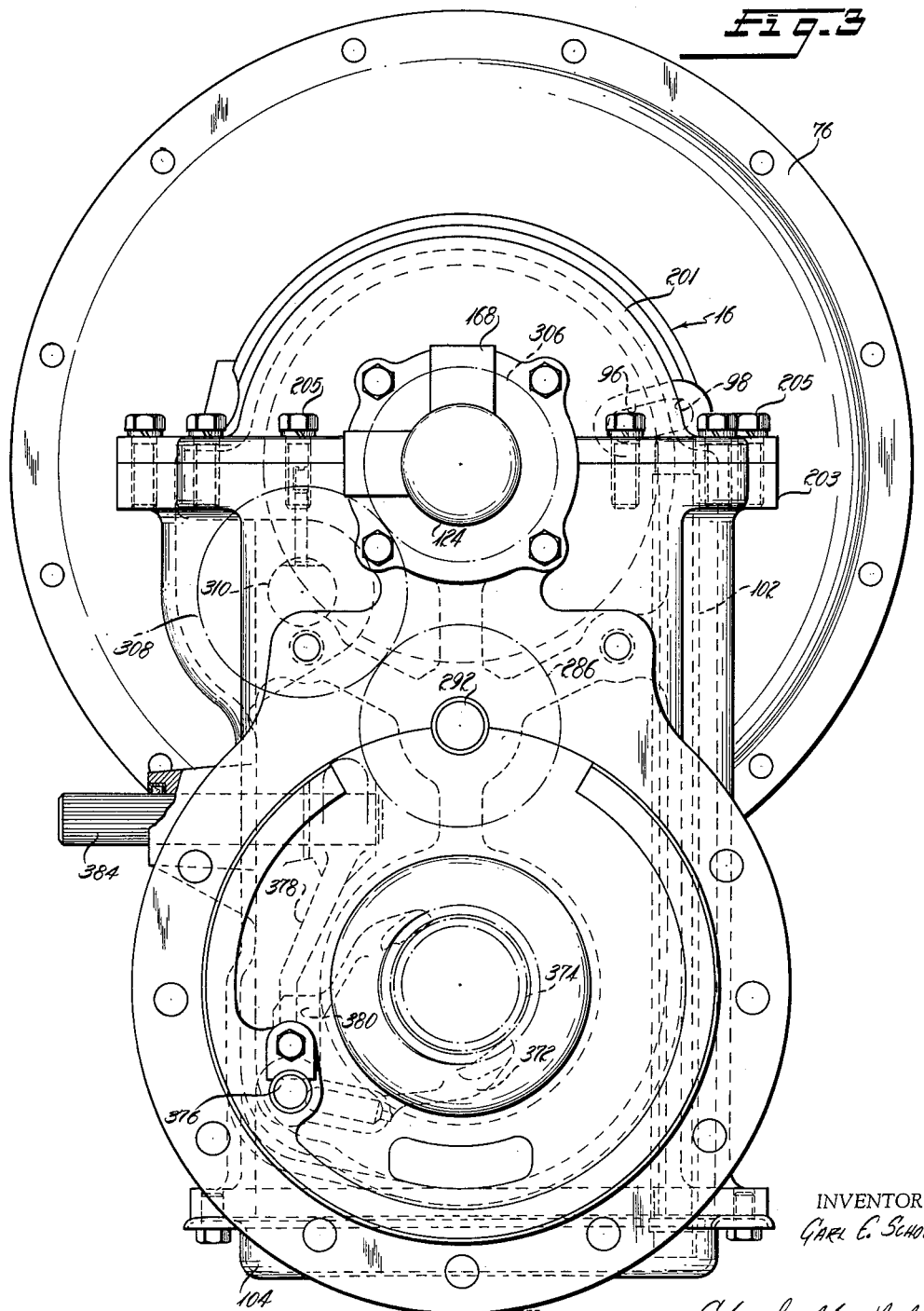

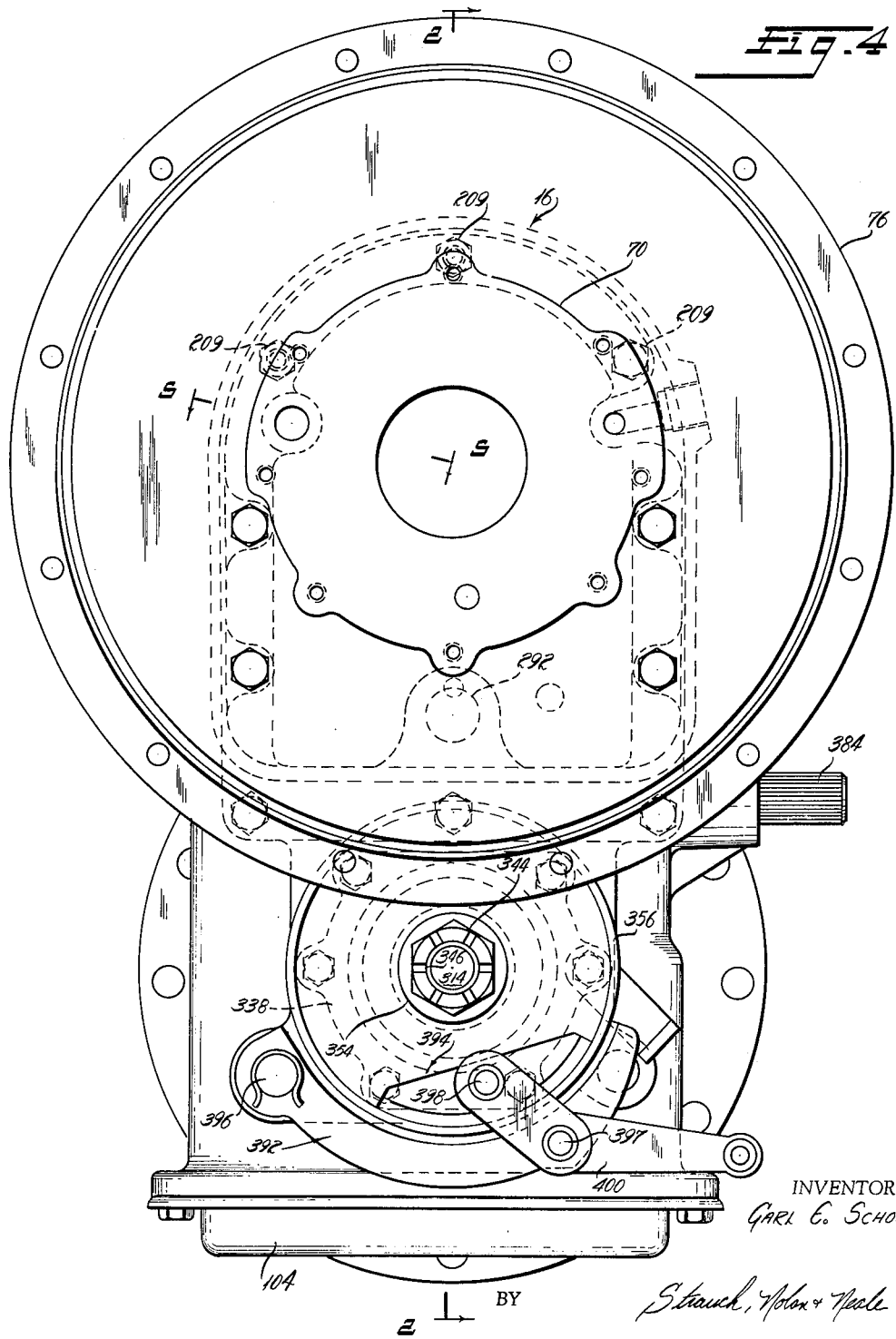

United States Patent Office 3,099,166
Patented July 30, 1963

3,099,166
DRIVE MECHANISM
Carl E. Schou, Oshkosh, Wis., assignor to Rockwell-Standard Corporation, Coraopolis, Pa., a corporation of Pennsylvania
Continuation of application Ser. No. 590,224, June 8, 1956. This application Feb. 9, 1960, Ser. No. 7,726
6 Claims. (Cl. 74—359)

This invention relates to improvements in vehicle drive mechanisms and has particular reference to a forward and reverse clutch arrangement, a fluid torque converter and the two speed transmission transfer gear construction for shop lift trucks and/or pay loaders.

In such vehicles fast and frequent selective shifting from forward to reverse is a must and in both forward and reverse infinitely variable speeds from zero to a maximum speed in two speed ranges are desirable and quite useful. My new improved drive train provides drive train means for such operation.

In the past in drive trains for vehicles of this type overheating and rapid excessive clutch element wear have been major problems.

The primary object of this invention is, therefore, to provide a new improved drive train for shop lift trucks and/or pay loaders not subject to overheating and rapid excessive clutch element wear.

Another object is to provide a new improved drive train with a forward and reverse clutching arrangement, a fluid torque converter and a two speed transmission transfer gear construction.

A further object is to provide a drive train with fast selective shifting from forward to reverse and infinitely variable speeds from zero to a maximum in two speed ranges, a work and a travel range, for both forward and reverse.

Another object is to provide an inexpensive combination of shaft and countershaft and gearing to give appropriate vehicle engine to wheel speed ratios.

A further object of this invention is to provide an improved friction clutch mechanism embodying means for applying a liquid coolant to the clutch faces thereof to reduce wear and overheating tendencies.

A further object is to provide a means for cooling clutch disc surfaces with oil circulated through the drive train fluid torque converter.

Another object is to provide a pin and bushing spacer construction extending through a cylinder head wall and two cylinder chambers joining and rotationally positioning two clutch actuating pistons in a clutch housing, a construction which allows for pin and opening spacing inaccuracies and which limits oil leakage between the cylinder chambers.

A further object of this invention is to provide an improved torque converter driven shop truck transmission and housing therefor embodying a clutch actuated reversing mechanism and of such construction that such mechanism is readily accessible and may be readily removed from said housing for maintenance purposes.

Further objects of the present invention will become apparent from the following description, when considered in connection with the accompanying drawings and the appended claims.

In the drawings, which illustrate one simple and practical embodiment of the invention:

Figure 2C:
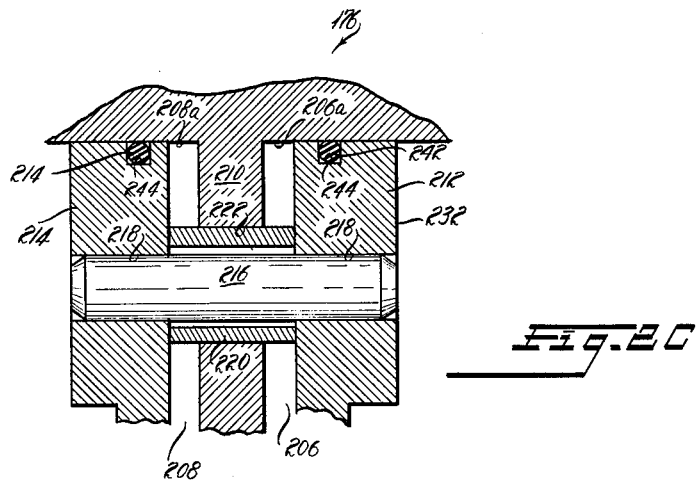
FIGURE 2 is a cut away and detailed view illustrating the fluid torque converter, the forward and reverse clutch arrangement and the two speed transmission transfer gear construction for a vehicle drive, being a section taken substantially along the line 2—2 of FIGURE 4.
Figure 2A:
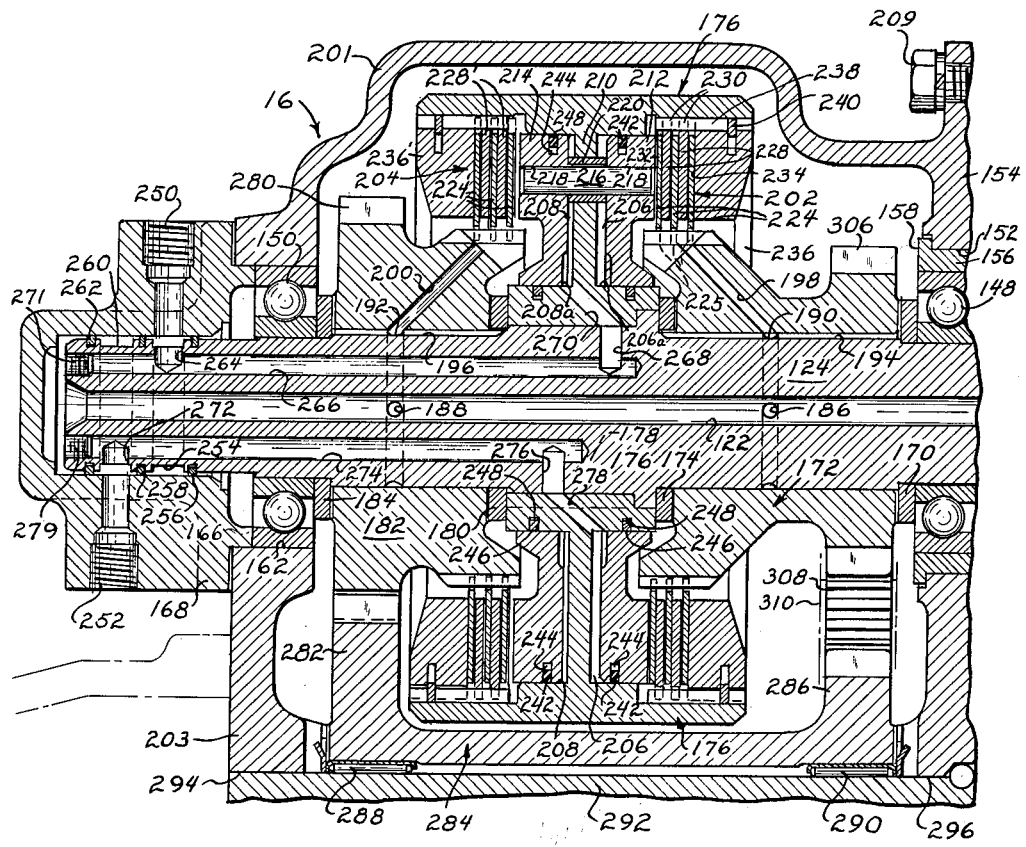
Figure 28:
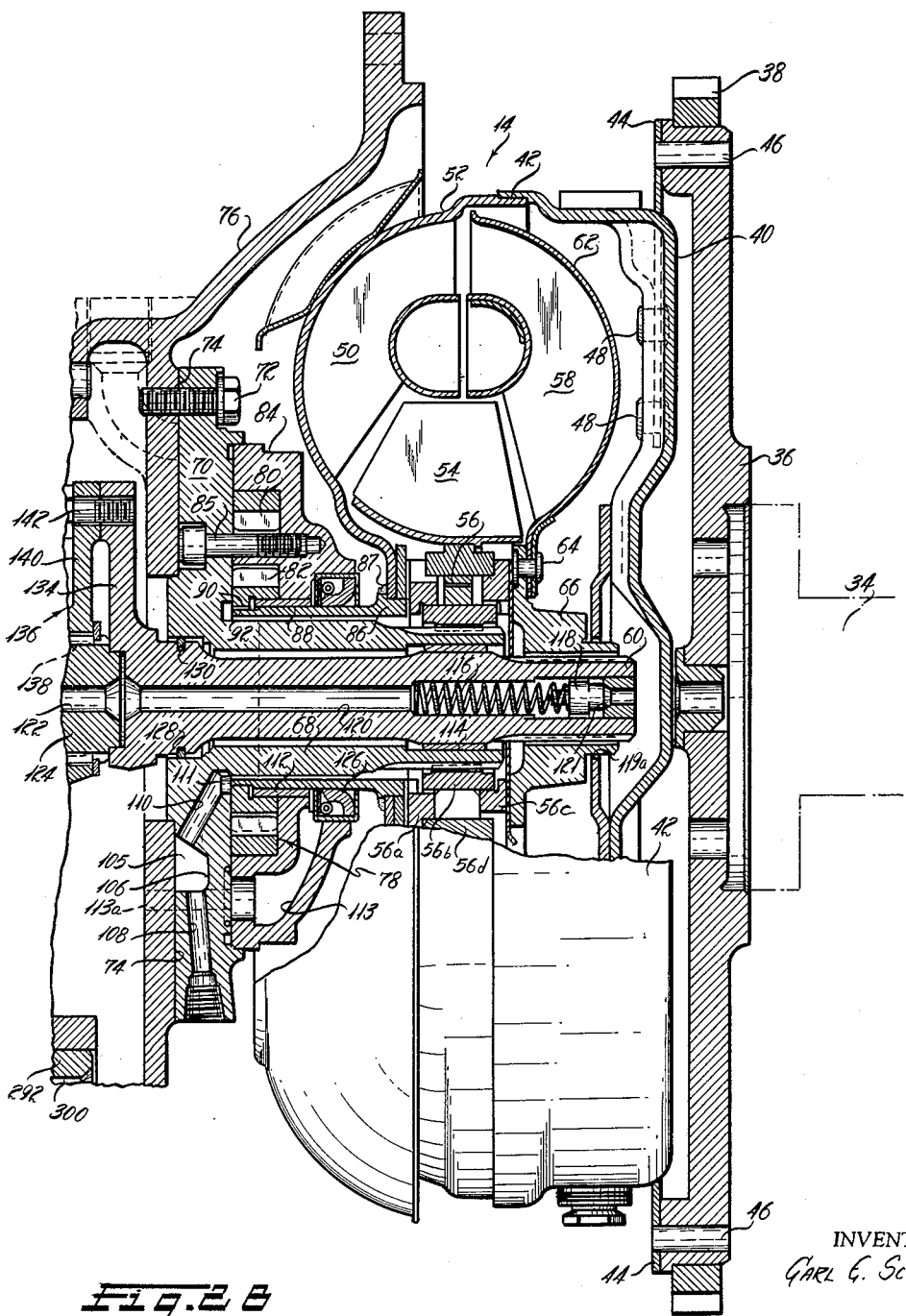

FIGURES 2A, 2B, and 2C are enlarged portions of FIGURE 2;

FIGURE 3 is a front view of the housing for the drive of FIGURE 2;

FIGURE 4 is a rear view of the housing for the drive of FIGURE 2 without the fluid torque converter;

FIGURE 5 is a fragmentary sectional view along the line 5—5 of FIGURE 4 illustrating oil suction line ducts in housing members.

Figure 1:
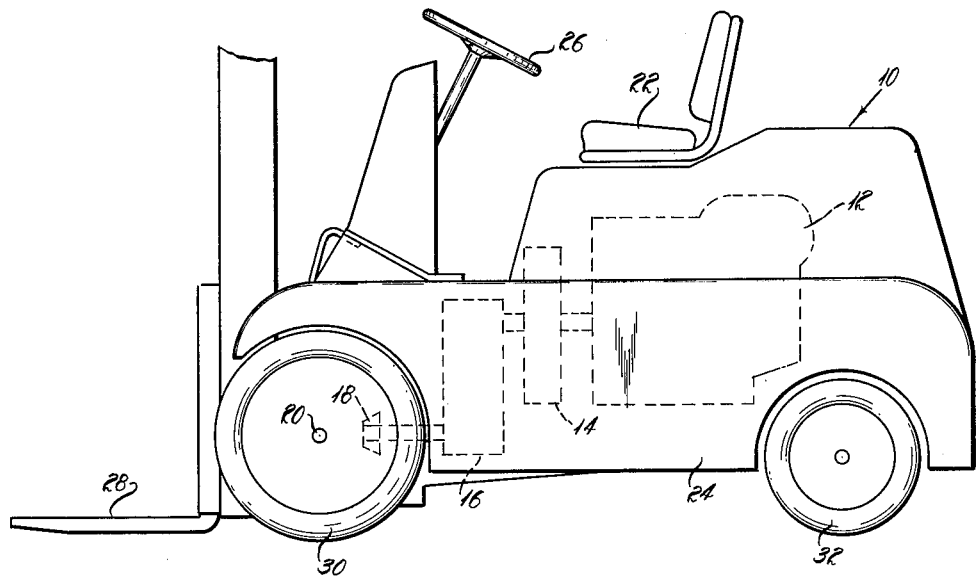
FIGURE 1 is a side elevation view of an industrial lift truck embodying the present invention.

Referring now to the drawings and more particularly to FIGURE 1 shop lift truck 10 is provided with a motor 12, a fluid torque converter 14 driven by motor 12, clutch transmission and transfer gear housing 16 and a bevel pinion 18 driving a bevel gear and differential to the axle shafts 20. The operator's seat 22, the body 24, the steering wheel 26, the lift fork 28, the front driving wheels 30 and the rear steering wheels 32 are also shown.

Referring also to FIGURES 2 and 2B, the vehicle drive train is provided with prime mover driven shaft 34 which mounts flywheel 36. Flywheel 36 mounted gear 38 may be used as a generator and/or hydraulic pump (not shown) driving gear in addition to use as a starter gear. Flywheel 36 is fastened to input casing member 40 of the casing assembly 42 fo fluid torque converter 14 by disc member 44, pins 46 and rivets 48. Fluid torque converter 14 is equipped with impeller blades 50, which are fixed to converter casing member 52 of casing assembly 42; a stator 54, which is restricted to one way rotation by sprag clutch means 56; and turbine blades 58, which are fixed to the converter output shaft 60 by blade retainer 62, rivets 64 and internally splined hub member 66. Sprag clutch means 56 and stator 54 are mounted on tubular member 68 the radially extending flange 70 of which is fixed by bolts 72 to surface 74 of bell clutch housing 76. While other fluid torque converters or fluid couplings may be used in place of fluid torque converter 14 in the new improved vehicle drive train, the illustrated converter 14 is preferred.

Hydraulic gear pump 78 with meshing internal gear 80 and external gear 82 is housed by flange 70 of tubular member 68 and by annular pump housing member 84 which is fastened to flange 70 by screws 85 and which supports internal gear 80 for rotation therein eccentric to shaft 60. Converter member 86 which is fixed to converter casing assembly 42 at 87 is provided with an axially extended hub 88 coaxially surrounding tubular member 68 and terminating in spline teeth 90 for driving engagement with the gear pump spline teeth 92 on gear 82. Pump 78, when driven, draws oil through suction line duct 94 (FIGURE 5) in flange 70, opening 96 through bell clutch housing 76, suction line duct 98 in transmission transfer gear housing 16 and suction tube 102 (FIGURES 2 and 3) from oil sump pan 104, and discharges it under pressure through a channel (not shown) in flange 70 into chamber 105 defined by opening 106 in flange 70 and face 74. Opening 108 extends from chamber 105 and provides a connection for an oil pressure line and a pressure gage (not shown). Opening 110 extends from chamber 105 to an annular chamber 111 from which oil flows to fluid torque converter 14. Converter oil flows from chamber 111 through splines 90 and 92 to lubricate journal bearing 112 between pump housing member 84 and hub 88 and is returned via channel 113 in pump housing 84 and opening 113a through flange 70 and member 76. Converter oil also flows from chamber 111 between members 68 and 88, through the openings between rings 56a and 56b and between rings 56b and 56d to lubricate journal bearing 114 between tubular member 68 and converter output shaft 60 and through the sprags of sprag clutch means 56 and the openings between rings 56c and 56d into housing 42 of fluid torque converter 14. Oil is constantly pumped into fluid torque converter 14 to maintain the desired predetermined operating pressure in housing 42 and the excess is passed through spring 116 loaded relief valve 118, which is axially slidably mounted through opening 120 of converter output shaft 60 and biased by spring 116 against valve seat 121, to limit oil pressure build up in the housing 42 of converter 14. Oil passes to valve 118 through opening 119a. The excess oil passing through valve 118 flows through opening 120 and into coaxial opening 122 of transmission input shaft 124. Oil seal 126 between pump housing member 84 and hub 88 and oil ring 128 in groove 130 of shaft 60 limit loss of oil from converter 14.

Referring to FIGURE 2, a separable coupling 132 is provided between converter output shaft 60 and transmission input shaft 124. A plurality of equiangularly spaced coupling arms 134 (FIGURE 2B) are formed integrally upon the end of shaft 60. A coupling member 136 which is internally splined 138 to shaft 124 has a like plurality of equiangularly spaced arms 140 which are aligned with and fastened to coupling arms 134 of shaft 60 by bolts 142. End 144 of shaft 124 is received in a snug piloting fit in counter bore 146 of shaft 60 to establish alignment between said shafts and to minimize oil leakage therebetween from passages 120 and 122.

Referring to FIGURES 2 and 2A, transmission input shaft 124 is rotatably supported in transmission transfer gear housing 16 by ball bearings 148 and 150. Ball bearings 148 is supported in opening 152 of housing wall 154 by member 156 which limits bearing axial movement with a flange 158 against the housing wall 154 and with the outer race of bearing 148 against flange 160. Ball bearing 150 is supported in opening 162 of housing wall 164 and is restrained from the axial movement by abutment of the outer race against an annular shoulder 166 of oil line commutator housing 168 which is fastened to wall 164.

The following items are supported on shaft 124 from the inner race of bearing 148 to the inner race of bearing 150 in this order: spacer washer 170, reverse gear and clutch member 172, spacer washer 174, clutch housing member 176 which is rotationally fixed to shaft 124 by a key 178, spacer washer 180, forward gear and clutch member 182 and spacer washer 184, members 172 and 182 being rotatable relative to shaft 124. Cross drilled diametral openings 186 and 188 are provided in shaft 124 intersecting through drilled oil coaxially extending opening 122 which extends the length of shaft 124. Openings 186 and 188 extend respectively to annular shaft grooves 190 and 192 in shaft 124 which carry oil to respective axially extending peripheral slots 194 and 196 to provide lubrication for gear and clutch members 172 and 182 which are rotatably journalled on shaft 124. Openings 198 and 200 are provided through gear and clutch members 172 and 182 respectively to carry oil by centrifugal action from annular grooves 190 and 192 to and to oil spray and flood the clutch surfaces of the respective multiple disc clutches 202 and 204 with oil for cooling. As is most clearly shown in FIGURE 3, the top 201 of transmission and transfer gear housing 16 is fastened to the housing bottom 203 along the horizontal centerline of transmission input shaft 124 by suitably spaced bolts 205 and is fastened to bell clutch housing 76 (FIGURE 2) along vertical face 207 by suitably spaced bolts 209, and may thus be readily removed from housing bottom 203 and bell clutch housing 76 to expose and for removing shaft 124 and clutch housing member 176.

Referring to FIGURE 2A, clutch housing member 176 embodies a pair of opposed expansible annular fluid chambers 206 and 208 defined in part by annular cylindrical recesses 206a and 208a in member 176 which face axially outwardly in opposite directions from a common radially extending cylinder head wall 210. Reversibly interchangeable pistons 212 and 214 are joined in fixed axially spaced relation in assembly by a plurality of equiangularly spaced pins 216, preferably three in number, which are press fitted into piston openings 218 and which extend through cylinder head wall 210. As is best shown in FIGURE 2C, this piston and pin assembly is rotationally positioned in clutch housing member 176 by means of sliding fit bushing spacers 220 which are sung sliding fits in cylinder head wall openings 222 in order to limit oil leakage between cylinder chambers 206 and 208. Spacing between the inner diameter of bushing spacers 220 and the outer diameter of the pins 216 allows for some inaccuracy in spacing of pins 216 and in spacing of openings 222.

In operation, when fluid is introduced under pressure into cylinder chamber 206 to expand that chamber, clutch discs 224 which are splined at 226 to gear and clutch member 172 and clutch discs 228 which are splined at 230 to clutch housing member 176 are squeezed together between clutch surface 232 of piston 212 and clutch surface 234 of clutch ring 236 to establish drive from member 176 through clutch 202 to member 172 for reverse drive. Clutch ring 236 is splined at 238 to clutch housing member 176 and axially locked in position therein by snap ring 240. When cylinder chamber 208 is expanded under fluid pressure, clutch discs 224' and clutch discs 228' are squeezed together between clutch surface 232' of piston 214 and clutch surface 234' of clutch ring 236' to establish drive from member 176 through clutch 204 to member 182 for forward drive. Oil rings 242 in piston grooves 244 and oil rings 246 in cylinder grooves 248 limit loss of oil from cylinders 206 and 208.

Separate oil lines (not shown) run from a manually operable control valve (not shown), which is connected to an oil pressure source, to inlet opening 250 in oil line commutator housing 168 to permit selective introduction of oil under pressure into chamber 208 for forward drive and to inlet opening 252 in housing 168 to permit selective introduction of oil under pressure into chamber 206 for reverse drive. Forward drive opening 250 extends to annular commutator groove 254 in shaft 124 between oil rings 256 and 258 and reverse drive opening 252 extends to annular commutator groove 260 in shaft 124 between oil rings 258 and 262. Opening 264 extends from groove 254 to axially extended opening 266 in shaft 124 from which opening 268 extends to an oil passage opening 270 to expansible cylinder chamber 208 in clutch housing member 176. Opening 266 is closed at its end by a plug 271. Opening 272 extends from groove 260 to axially extended opening 274 in shaft 124 from which opening 276 extends to an oil passage opening 278 to expansible cylinder chamber 206 in member 176. Opening 274 is closed at its end by a plug 279. In this construction pressure on one of the pistons 212 and 214 created by a build up of oil pressure in one of the cylinder chambers 206 and 208 from the action of centrifugal force on the oil is balanced by pressure on the other piston by centrifugal force built up oil pressure in the other cylinder chamber. Centrifugal force therefore has no effect upon the clutching and declutching control of disc clutches 202 and 204 throughout the range of rotative speeds of clutch housing member 176 and shaft 124.

Gear 280 of forward gear and clutch member 182 is in constant mesh with gear 282 at one end of gear member 284 which is formed with gear 286 at the other end. Gear member 284 is rotatably mounted by needle type antifriction bearings 288 and 290 on intermediate shaft 292 which is mounted in aligned openings 294 and 296 in the opposite walls of housing bottom 203. Referring to FIGURE 2, oil is supplied to bearings 288 and 290 from oil housing well 298, defined by wall 154 of housing bottom 203 and wall 299 of bell clutch housing 76, through countershaft openings 300 and 302 to annular opening 304 between bearings 288 and 290 in gear member 284. Referring to FIGURES 2A and 3, gear 306 of reverse gear and clutch member 172 meshes with reverse idler gear 308 which is rotatably mounted on countershaft 310. Reverse idler gear 308 also meshes with gear 286 of gear member 284. The axial spacing between gears 282 and 286 of gear member 284 provides clearance for clutch housing member 176.

Referring to FIGURE 2, gear 286 of gear member 284 meshes with low speed gear 312 which is rotatably journalled on transmission transfer gear box output shaft 314 by journal bearing insert 316. Gear 282 of gear member 284 meshes with high speed gear 318 which is rotatably journalled on output shaft 314 by journal bearing insert 320. Collar 322 is non-rotatably splined at 324 to output shaft 314 which is rotatably supported in housing bottom 203 by opposed tapered roller thrust bearings 326 and 328. Bearing 326 is restrained from axial movement from opening 330 in wall 164 of housing 16 by snap ring 332 and bearing 328 from axial movement in opening 334 of wall 154 by snap ring 336 which is held in place against wall 154 by the retainer 338 for oil seal 340. The following items are held in axial abutment on output shaft 314 from shoulder 342 of pinion bevel gear 18 to nut 344 on shaft threads 346 in the following order: The inner race of bearing 326, gear 318, washer 348, collar 322, washer 350, gear 312, washer 352, the inner race of bearing 328 and the hub 354 of brake drum 356 which is splined at 358 to shaft 314.

Clutch collar 360 is internally splined for axial shifting along external splines 362 of collar 322. Collar 360 is equipped with bevel ended external clutch splines 364 at one end for controlled clutching and declutching to and from engagement with complementary bevel ended internal clutch splines 366 of low speed gear 312. At the other end collar 360 is equipped with bevel ended external clutch splines 368 for controlled clutching and declutching to and from engagement with complementary bevel ended internal clutch splines 370 of high speed gear 318. Clutch collar 360 is shifted from the neutral position shown in FIGURE 2 to clutched engagement for drive from low speed gear 312 to output shaft 314 or to clutched engagement for drive from high speed gear 318 to shaft 314 by shift fork 372 (see also FIGURE 3) which is received in annular shift groove 374 of collar 360. Shift fork 372 is axially shiftably mounted on housing supported shift rail 376. Lever arm 378 rounded end 380 of which is received in socket 382 and shift actuating rod 384 which projects through housing opening 386 are pivotable to axially shift fork 372 along the axis of shift rail 376 and to axially shift clutch collar 360 as desired from its neutral position, as shown, to either of its alternative engaged positions, as above described.

Pinion bevel gear 18 meshes with a differential case mounted bevel gear (not shown) within differential bowl 388 of axle housing 390, the differential being journalled for rotation about the axis 391 of shafts 20. Axle housing 390 is fastened to wall 164 of transmission and transfer gear housing bottom 203 by conventional means (not shown). Referring to FIGURE 4 brake shoes 392 and 394 which are pivotally supported on the housing at pivot pin 396 and pivotally connected at 397 and 398 to an actuating lever 400 operatively engage brake drum 356 externally and internally respectively when brake actuating lever 400 is raised.

From the foregoing it is apparent that there is hereby provided a new improved vehicle drive train for shop lift trucks and pay loaders with a fluid torque converter, a forward and reverse clutch arrangement and a two speed transmission transfer gear construction. It provides a hydraulic clutching system which permits fast selective shifting from forward to reverse with clutch cooling by oil circulated from the drive train fluid torque converter. It provides a drive train with infinitely variable speeds from zero to a maximum in two speed ranges, a work and a travel range, for both forward and reverse. It also provides a pin and bushing spacer construction joining two clutch actuating pistons which allows for pin and clutch housing opening spacing inaccuracies and which limits oil leakage between the cylinder chambers.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

This application is a continuation of application Serial No. 590,224 filed June 8, 1956, now abandoned.

What is claimed and desired to be secured by United States Letters Patent is:

1. In combination, a torque converter, a transmission having a housing, an input shaft and an output shaft journalled in said housing about spaced parallel axes, first and second gear sets extending between said shafts and providing respectively forward and reverse drive to said output shaft from said input shaft, each of said gear sets having at least one gear journalled on said input shaft, a disc type friction clutch mechanism mounted on said input shaft between said gears journalled on said input shaft and selectively operative to connect the gear of said first set or said second gear set which is journalled on said input shaft in drive relation to said input shaft, and means in said housing defining an oil sump, means defining a fluid channel from said oil sump to said converter, means in said input shaft and in said gears journalled on said input shaft providing a fluid communication channel from said torque converter to said friction clutch mechanism and terminating in an outlet opening in each of said gears from which oil is discharged onto the discs of said clutch mechanism, and means for controlling fluid flow in said channel from said torque converter.

2. A readily serviceable drive train for shop trucks comprising a torque converter; a housing for said torque converter; a change speed transmission having a two part separably connected housing, an input shaft journalled in said housing for rotation about an axis lying in the parting plane between the two parts of said housing, an output shaft journalled in said housing in spaced parallel relation to said input shaft, forward drive and reverse drive alternatively operable gear sets interconnecting said shafts within said housing, and a friction clutch mechanism mounted on said input shaft and optionally operative to connect said first or said second gear set in drive relation to said input shaft; means mounting said torque converter housing on said transmission housing with said torque converter in axial alignment with said input shaft and providing a separable connection between said converter housing and one of said transmission housing parts, and a coupling interconnecting said input shaft to said torque converter including coupling disconnecting means manipulatable after detachment of said one housing part from the other transmission housing part and from said torque converter housing.

3. In combination, a pair of axially spaced relatively rotatable output members, an input member mounted for rotation coaxially between said output members, means at the adjacent sides of said output members defining friction clutch faces, means at the opposite ends of said input member defining clutch faces engageable with the opposed one of said output member clutch faces, a pair of opposed expansible chamber fluid motors comprising means on said input member defining a pair of oppositely extending annular piston receiving cylinders with a common cylinder head wall having circumferentially spaced openings, an annular piston mounted in each of said cylinders inwardly of said input member clutch faces, means rigidly connecting said pistons for concomitant axial movement including elongate members secured at their ends to both of said pistons and disposed through said openings, a sleeve bushing spacer disposed with clearance around each elongate member and disposed with a close sliding fit in a respective opening in said cylinder head wall, and means for introducing pressure into either of said cylinders to expand the chamber thereof and effect engagement of the coacting pair of said clutch faces.

4. A readily serviceable drive train as defined in claim 2 wherein said friction clutch mechanism comprises: a clutch mechanism housing member secured to said input shaft; two annular, axially spaced, coaxial cylinders in said housing member with a common cylinder head wall having circumferentially spaced openings; an annular piston in each of said annular cylinders; spacer devices secured between said two annular pistons, each device comprising a sleeve bushing spacer between said pistons disposed with a close sliding fit through an associated one of said openings, and an elongate member rigidly secured to each of said pistons and passing through its associated sleeve bushing spacer with sufficient clearance from the inner walls of said associated sleeve bushing spacer to enable proper piston to cylinder alignment unaffected by inaccuracies in spacing of said cylinder head wall openings.

5. In combination, a transmission having a housing, an input shaft and an output shaft journalled in said housing about spaced parallel axes, first and second gear sets extending between said shafts and providing two selective drive ratios to said output shaft from said input shaft, each of said gear sets having at least one gear journalled on said input shaft, a disc type friction clutch mechanism mounted on said input shaft between said gears journalled on the input shaft and selectively operative to connect the gear of said first gear set or said second gear set which is journalled on said input shaft in drive relation to said input shaft, means defining a pair of pressure chambers in said clutch mechanism, means in said housing defining an oil sump, an oil pump in said housing operatively connected to said sump, means providing a passage through said input shaft connected substantially directly to the inner ends of separate branch passages extending through said gears journalled on said input shaft providing a first fluid communication channel means delivering oil from said sump to said friction clutch mechanism and said branch passages terminating in an outlet opening in each of said gears from which oil is discharged substantially directly onto the discs of said clutch mechanism, and further means in said input shaft providing second fluid communication channel means independent of said first channel means for controlling hydraulic fluid flow into said pressure chambers.

6. In combination, a transmission having a housing, an input shaft and an output shaft journalled in said housing about spaced parallel axes, first and second gear sets extending between said shafts and providing two selective drive ratios to said output shaft from said input shaft, each of said gear sets having at least one gear journalled on said input shaft, a disc type friction clutch mechanism mounted on said input shaft between said gears journalled on the input shaft and selectively operative to connect the gear of said first gear set or said second gear set which is journalled on said input shaft in drive relation to said input shaft, a hydraulic actuator in said clutch mechanism, means in said housing defining an oil sump, an oil pump in said housing operatively connected to said sump, means providing a passage through said input shaft connected substantially directly to the inner ends of separate branch passages extending through said gears journalled on said input shaft providing a fluid communication channel means delivering oil from said sump to said friction clutch mechanism and said branch passages terminating in an outlet opening in each of said gears from which oil is discharged substantially directly onto the discs of said clutch mechanism, and means including an oil passage through the input shaft independent of said channel means to said actuator for controlling said clutch mechanism.

References Cited in the file of this patent
UNITED STATES PATENTS

| | | |
|---|---|---|
| 2,632,544 | Hockert | Mar. 24, 1953 |
| 2,757,552 | English | Aug. 7, 1956 |
| 2,861,480 | Curtis | Nov. 25, 1958 |
| 2,953,941 | Schwartz et al. | Sept. 27, 1960 |